United States Patent
Kim et al.

(10) Patent No.: US 9,284,217 B2
(45) Date of Patent: Mar. 15, 2016

(54) LOW-EMISSIVITY TRANSPARENT LAMINATED BODY AND BUILDING MATERIAL COMPRISING SAME

(71) Applicant: LG Hausys, Ltd., Seoul (KR)

(72) Inventors: Ung Kil Kim, Gunpo-si (KR); Youn-Ki Jun, Gwacheon-si (KR); Dae Hoon Kwon, Seoul (KR)

(73) Assignee: LG Hausys, Ltd., Seoul (KR)

( * ) Notice: Subject to any disclaimer, the term of this patent is extended or adjusted under 35 U.S.C. 154(b) by 0 days.

(21) Appl. No.: 14/407,291

(22) PCT Filed: Dec. 27, 2012

(86) PCT No.: PCT/KR2012/011566
§ 371 (c)(1),
(2) Date: Dec. 11, 2014

(87) PCT Pub. No.: WO2013/191345
PCT Pub. Date: Dec. 27, 2013

(65) Prior Publication Data
US 2015/0132571 A1    May 14, 2015

(30) Foreign Application Priority Data
Jun. 19, 2012 (KR) .................. 10-2012-0065545

(51) Int. Cl.
*B32B 15/04* (2006.01)
*B32B 17/06* (2006.01)
*C03C 17/34* (2006.01)
(Continued)

(52) U.S. Cl.
CPC ........... *C03C 17/3405* (2013.01); *C03C 17/008* (2013.01); *C03C 17/36* (2013.01); *C03C 17/366* (2013.01); *C03C 17/3607* (2013.01); *C03C 17/3618* (2013.01); *C03C 17/3626* (2013.01); *C03C 17/3644* (2013.01); *C03C 2217/21* (2013.01); *C03C 2217/258* (2013.01);
(Continued)

(58) Field of Classification Search
USPC ......... 428/428, 432, 434, 688, 689, 697, 699, 428/701, 702, 698
See application file for complete search history.

(56) References Cited

U.S. PATENT DOCUMENTS

| 6,589,658 | B1 | 7/2003 | Stachowiak |
| 2003/0099842 | A1 | 5/2003 | Za-Gdoun et al. |

(Continued)

FOREIGN PATENT DOCUMENTS

| CN | 101237990 A | 8/2008 |
| DE | 102005039707 A1 | 3/2007 |

(Continued)

OTHER PUBLICATIONS

International Search Report for PCT/KR2012/011566 mailed Apr. 5, 2013, citing the above reference(s).

(Continued)

*Primary Examiner* — David Sample
*Assistant Examiner* — Lauren Colgan
(74) *Attorney, Agent, or Firm* — Hauptman Ham, LLP

(57) ABSTRACT

Provided are: a low-emissivity transparent laminated body having a multilayer structure comprising a substrate and a coated layer, wherein the coated layer comprises, sequentially from the substrate, a low-emissivity electrically-conductive layer, a dielectric layer, and a light-absorbing metal layer; and a building material in which same is used.

7 Claims, 2 Drawing Sheets

(51) Int. Cl.
*C03C 17/00* (2006.01)
*C03C 17/36* (2006.01)

(52) U.S. Cl.
CPC ....... *C03C2217/26* (2013.01); *C03C 2217/281* (2013.01); *Y10T 428/265* (2015.01)

(56) References Cited

U.S. PATENT DOCUMENTS

2011/0261442 A1* 10/2011 Knoll et al. .................. 359/360
2012/0087005 A1   4/2012 Reymond et al.
2013/0057951 A1*  3/2013 Hevesi et al. ................ 359/359

FOREIGN PATENT DOCUMENTS

| KR | 970000383 B1 | 1/1997 |
| KR | 20080015002 A | 2/2008 |
| KR | 20090099364 A | 9/2009 |
| KR | 20110062566 A | 6/2011 |
| WO | 2011062574 A1 | 5/2011 |
| WO | WO2011-147864 * | 12/2011 |

OTHER PUBLICATIONS

European Search Report mailed on Jul. 27, 2015 in connection with the counterpart European Patent Application No. 12879192.8, citing the above reference(s).

* cited by examiner

LOW-EMISSIVITY TRANSPARENT LAMINATED BODY AND BUILDING MATERIAL COMPRISING SAME

CROSS REFERENCE TO RELATED APPLICATION

This application claims the priority of Korean Patent Application No. 10-2012-0065545 filed on Jun. 19, 2012 in the Korean Patent and Trademark Office. Further, this application is the National Phase application of International Application No. PCT/KR2012/011566 filed on Dec. 27, 2012, which is incorporated herein by reference in its entirety.

TECHNICAL FIELD

The present invention relates to a low-emissivity transparent laminate and a building material including the same.

BACKGROUND ART

Low-emissivity glass is glass on which a low-emissivity layer including a metal, such as silver (Ag), which has high reflectance in an infrared range, is deposited as a thin film. Low-emissivity glass is a functional material realizing energy saving effects by reflecting solar radiation in summer and preserving infrared rays generated from an indoor heater in winter.

Generally, since silver (Ag) used as the low-emissivity layer is oxidized when exposed to air, dielectric layers are deposited as anti-oxidizing films on upper and lower surfaces of the low-emissivity layer.

The dielectric layers also serve to increase visible light transmittance.

DISCLOSURE

Technical Problem

It is an aspect of the present invention to provide a low-emissivity transparent laminate which exhibits improved heat resistance and thus is temperable while securing thermal insulation properties.

It is another aspect of the present invention to provide a building material including the low-emissivity transparent laminate as set forth above.

Technical Solution

In accordance with one aspect of the present invention, a low-emissivity transparent laminate includes a substrate and a coating layer. The coating layer may be formed in a multilayer structure including a low-emissivity layer, a low-emissivity protective metal layer, a silicon nitride layer and a dielectric layer stacked sequentially from the substrate The low-emissivity layer may have an emissivity of about 0.01 to about 0.3.

The low-emissivity layer may include at least one selected from the group consisting of Ag, Au, Cu, Al, Pt, ion-doped metal oxides, and combinations thereof.

The low-emissivity layer may have a thickness of about 10 nm to about 25 nm.

The low-emissivity protective metal layer may have an extinction coefficient of about 1.5 to about 3.5 in a visible light range.

The low-emissivity protective metal layer may include at least one selected from the group consisting of Ni, Cr, alloys of Ni and Cr, Ti, and combinations thereof.

The low-emissivity protective metal layer may have a thickness of about 1 nm to about 5 nm.

The silicon nitride layer may include $SiN_x$ ($1 \leq x \leq 1.5$) or $(Si_{1-y}M_y)N_z$ (where M is one selected from the group consisting of Al, Ti, Co and combinations thereof; $0.01 \leq y \leq 0.2$; and $1 \leq z \leq 1.5$).

The silicon nitride layer may have a thickness of about 5 nm to about 20 nm.

The dielectric layer may include at least one selected from the group consisting of metal oxides, metal nitrides and combinations thereof, or may include at least one selected from the group consisting of metal oxides, metal nitrides and combinations thereof, which are doped with at least one element selected from the group consisting of bismuth (Bi), boron (B), aluminum (Al), silicon (Si), magnesium (Mg), antimony (Sb), beryllium (Be), and combinations thereof.

The dielectric layer may include at least one selected from the group consisting of titanium oxide, zinc tin oxide, zinc oxide, zinc aluminum oxide, tin oxide, bismuth oxide, silicon nitride, silicon aluminum nitride, and combinations thereof.

The dielectric layer may have a thickness of about 5 nm to about 60 nm.

The substrate may be a transparent substrate having a visible light transmittance of about 90% to about 100%.

The substrate may be a glass or transparent plastic substrate.

The coating layer has a symmetrical structure in which the low-emissivity protective metal layer and the dielectric layer are sequentially stacked on both surfaces of the low-emissivity layer, and at least one of two pairs of the low-emissivity protective metal layer and the dielectric layer may include the silicon nitride layer interposed therebetween.

The coating layer may further include at least one silicon nitride layer on uppermost and lowermost surfaces thereof.

In accordance with another aspect of the present invention, a building material includes the low-emissivity transparent laminate as set forth above.

Advantageous Effects

The low-emissivity transparent laminate can exhibit improved heat resistance and thus is temperable while securing thermal insulation properties.

BEST MODE

Figure 1:
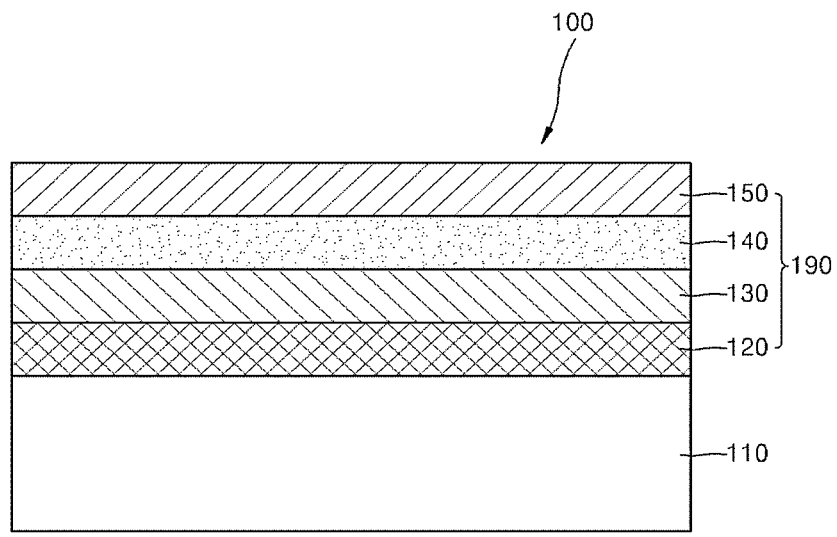
FIG. 1 is a schematic sectional view of a low-emissivity transparent laminate according to one embodiment of the present invention.

Hereinafter, embodiments of the present invention will be described in detail with reference to the accompanying drawings. It should be understood that the following embodiments may be embodied in different ways and are not to be in any way construed as limiting the present invention.

In the drawings, portions irrelevant to the description are omitted for clarity. Like components will be denoted by like reference numerals throughout the specification.

In the drawings, thicknesses of several layers and regions are enlarged for clarity. In addition, thicknesses of some layers and regions are exaggerated for convenience.

It will be understood that when an element such as a layer, film, region or substrate is referred to as being placed "on" (or under or below) another element, it can be directly placed on (or under or below) the other element, or intervening layer(s) may also be present.

Hereinafter, a low-emissivity transparent laminate according to one embodiment of the invention will be described in detail with reference to FIG. 1.

FIG. 1 is a sectional view of a low-emissivity transparent laminate 100 according to one embodiment of the present invention, which includes a substrate 110 and a coating layer 190. The coating layer 190 has a multilayer structure that includes a low-emissivity layer 120, a low-emissivity protective metal layer 130, a silicon nitride layer 140 and a dielectric layer 150 in a sequential order from the substrate 110.

Since the low-emissivity transparent laminate 100 includes the silicon nitride layer 140, the low-emissivity transparent laminate 100 is given durability, chemical resistance, heat resistance and the like, and thus is temperable. In addition, since the low-emissivity transparent laminate 100 includes the dielectric layer 150 on an upper side of the silicon nitride layer 140, contamination of the silicon nitride layer 140 upon long time processing can be reduced, thereby preventing problems which can be caused by such contamination. Further, the low-emissivity transparent laminate 100 enables enlargement of design for optical properties of low-emissivity (low-e) glass.

The coating layer 190 has a multilayer thin film structure based on the low-emissivity layer 120 selectively reflecting far infrared rays of sunlight, and imparts thermal insulation properties due to low emissivity to the low-emissivity transparent laminate 100 by reducing emissivity. The low-emissivity transparent laminate 100 having such a structure is a functional material realizing energy saving effects for buildings by reflecting solar radiation in summer while preserving infrared rays generated from an indoor heater in winter.

The term "emissivity" as used herein refers to a ratio by which an object absorbs, transmits and reflects energy having any specific wavelength. That is, the term "emissivity" as used herein indicates a degree of absorption of infrared energy in an infrared wavelength range, and specifically refers to a ratio of absorbed infrared energy to applied infrared energy when far infrared rays, which correspond to a wavelength range from about 5 μm to about 50 μm and exhibit strong thermal action, are applied.

According to Kirchhoff's law, since infrared energy absorbed by a certain material is the same as energy radiated back from the material, absorptivity of the material is the same as emissivity thereof.
In addition, since infrared energy not absorbed by a material is reflected by a surface of the material, emissivity becomes lower with increasing reflectance of infrared energy. This relationship is represented by Formula: Emissivity=1−reflectance of infrared light.

Emissivity may be measured through various methods typically known in the art. For example, emissivity may be measured using an apparatus such as a Fourier transform infrared spectrometer (FT-IR) in accordance with KSL2514, without being limited thereto.

Absorptivity for far infrared rays exhibiting strong thermal action, that is, emissivity for far infrared rays, may have a very important meaning in measurement of a degree of thermal insulation.

As described above, since the low-emissivity transparent laminate 100 includes the coating layer 190 formed on the transparent substrate 110 such as a glass substrate and the like, the low-emissivity transparent laminate 100 can exhibit reduced emissivity while maintaining certain transmissivity in a visible light range, and thus can be used as an energy-saving functional material for buildings providing excellent thermal insulation.

The low-emissivity layer 120 is formed of an electrically conductive material having low-emissivity, for example, metal, and has low sheet resistance, thereby securing low-emissivity. For example, the low-emissivity layer 120 may have an emissivity from about 0.01 to about 0.3, specifically from about 0.01 to about 0.2, more specifically from about 0.01 to about 0.1, still more specifically from about 0.01 to about 0.08. Within this range, the low-emissivity transparent laminate 100 can exhibit appropriate properties in terms of both thermal insulation and visible light transmittance. The low-emissivity layer 120 having an emissivity within this range may have a sheet resistance of about 0.78 Ω/sq to about 6.42 Ω/sq, as measured on a thin film specimen.

The low-emissivity layer 120 serves to selectively transmit and reflect solar radiation. The low-emissivity layer 120 may include at least one selected from the group consisting of Ag, Au, Cu, Al, Pt, ion-doped metal oxides, and combinations thereof, without being limited thereto. Examples of the ion-doped metal oxides include indium tin oxide (ITO), fluorine-doped tin oxide (FTO), Al-doped zinc oxide (AZO), gallium zinc oxide (GZO), and the like. In one embodiment, the low-emissivity layer 120 may be silver (Ag), whereby the low-emissivity transparent laminate 100 can realize high electrical conductivity, low absorptivity in the visible light range, excellent durability, and the like.

The low-emissivity layer 120 may have a thickness of, for example, about 10 nm to about 25 nm. Within this thickness range, the low-emissivity layer 120 is suitable for realizing both low-emissivity and high visible light transmittance at the same time.

The low-emissivity protective metal layer 130 is composed of a metal exhibiting excellent light absorption to adjust sunlight. A color realized by the low-emissivity transparent laminate 100 may be adjusted by adjusting a material, thickness and the like of the low-emissivity protective metal layer 130.

In one embodiment, the low-emissivity protective metal layer 130 may have an extinction coefficient of about 1.5 to about 3.5 in the visible light range. Extinction coefficient is a value derived from an optical constant which an optical material has as an inherent property, and the optical constant is represented by an expression, n-ik. Here, the real part n is an index of refraction, and the imaginary part k is an extinction coefficient (also referred to as absorption coefficient). The extinction coefficient is a function of wavelength ($\lambda$), and metal generally has an extinction coefficient of greater than 0. The extinction coefficient k and the absorption coefficient $\alpha$ are expressed by Formula: $\alpha=(4\pi k)/\lambda$. When the absorption coefficient is a and the thickness through which light passes is d, the intensity of light passing through the thickness d (I) is decreased according to Formula $I=I0\exp(-\alpha d)$, as compared with the intensity of incident light (I0).

Since the low-emissivity protective metal layer 130 uses a metal having an extinction coefficient within the above range in the visible light range, the low-emissivity protective metal layer 130 absorbs a certain portion of visible light and allows the low-emissivity transparent laminate 100 to have a predetermined color.

For example, the low-emissivity protective metal layer 130 may include at least one selected from the group consisting of Ni, Cr, alloys of Ni and Cr, Ti, and combinations thereof, without being limited thereto.

The low-emissivity protective metal layer 130 may have a thickness of, for example, about 1 nm to about 5 nm. Since the low-emissivity transparent laminate 100 includes the low-emissivity protective metal layer 130 having a thickness within this range, the low-emissivity transparent laminate 100 can be adjusted to predetermined transmittance and reflectance while serving as a low-emissivity protective layer.

Since the silicon nitride layer 140 is interposed between the low-emissivity protective metal layer 130 and the dielectric layer 150 and thus serves as a protective layer protecting the low-emissivity protective metal layer 130 and the low-emissivity layer 120 from an influence of oxygen of an oxide in the dielectric layer 150, the silicon nitride layer 140 serves to stabilize an interface between a metal and the dielectric layer.

In addition, the low-emissivity transparent laminate 100 includes the silicon nitride layer 140 and thus can improve overall heat resistance of the coating layer 190. Thus, there is an advantage in that the low-emissivity transparent laminate 100 can be subjected to high temperature processing. For example, the low-emissivity transparent laminate 100 may exhibit heat resistance suitable for heat treatment in order to satisfy wind pressure resistance required for skyscrapers.

The silicon nitride layer 140 may include silicon nitride, for example, $SiN_x$ (where $1 \leq x \leq 1.5$) or a silicon nitride compound in which some Si is substituted with a metal, such as $(Si_{1-y}M_y)N_z$ (where M is one selected from the group consisting of Al, Ti, Co, and combinations thereof; $0.01 \leq y \leq 0.2$; and $1 \leq z \leq 1.5$), and the like.

The metal-substituted silicon nitride compound may exhibit improved durability, scratch resistance, heat resistance and the like depending upon the substituted metal. The silicon nitride layer 140 may include a suitable type of silicon nitride compound so as to satisfy desired purposes.

The silicon nitride layer 140 may have a thickness of, for example, about 5 nm to about 20 nm. To realize the overall coating layer 190 exhibiting optical properties (transmittance, reflectance, color index) satisfying target properties, the thickness of the silicon nitride layer may be variously adjusted depending upon installation environment and materials thereof. Since the low-emissivity transparent laminate 100 includes the silicon nitride layer 140 having a thickness within the above range, the low-emissivity transparent laminate 100 can minimize contamination which can occur upon stacking the dielectric layer 150, and allows various combinations of the layers by adjusting a thickness ratio of the dielectric layer 150, thereby enabling design of various optical properties of low-e glass.

The dielectric layer 150 is stacked on the silicon nitride layer 140 in the coating layer 190 and thus is separated from the low-emissivity protective metal layer 130 with the silicon nitride layer 140 interposed therebetween. As described above, since the dielectric layer 150 is separated from the low-emissivity protective metal layer 130 and the low-emissivity layer 120 with the silicon nitride layer 140 interposed therebetween, influence on the low-emissivity protective metal layer 130 and the low-emissivity layer 120 due to oxygen caused by the oxide in the dielectric layer 150 can be significantly reduced.

The dielectric layer 150 may be formed of a dielectric material having an index of refraction from about 1.5 to about 2.3. Depending upon the index of refraction of the dielectric layer 150, the thickness of the dielectric layer 150 may be adjusted such that transmittance, reflectance, and transmissive and reflective colors of the dielectric layers can be realized to desired target levels.

The dielectric layer 150 may have a thickness of, for example, about 5 nm to about 60 nm. The thickness of the dielectric layer 150 may be variously adjusted depending upon the location and material of the dielectric layer so as to realize optical properties (transmittance, reflectance, color index) of the overall multilayer thin film satisfying target properties. Within the above thickness range, the dielectric layer 150 enables effectively control of optical properties of the multilayer thin film and can provide an advantage in terms of production rate. In addition, as described above, the dielectric layer 150 allows various combinations of layers by adjusting the thickness ratio thereof relative to the silicon nitride layer 140 and the like, thereby enabling enlargement of optical design window of low-e glasses.

In addition, the dielectric layer 150 may be formed of a material having an extinction coefficient close to 0. An extinction coefficient of greater than 0 means that incident light is absorbed by the dielectric layer before reaching a light absorption metal layer, and is not advantageous by inhibiting transparency. Therefore, the dielectric layer 150 may have an extinction coefficient of less than 0.1 in the visible light range (wavelength range from about 380 nm to about 780 nm).

Since a metal used for the low-emissivity layer 120 is generally likely to be oxidized, the dielectric layer 150 can act as an anti-oxidation film for the low-emissivity layer 120. In addition, the dielectric layer 150 also serves to increase visible light transmittance.

The dielectric layer 150 may include various metal oxides, metal nitrides, and the like. For example, the dielectric layer 150 may include at least one selected from the group consisting of titanium oxide, zinc tin oxide, zinc oxide, zinc aluminum oxide, tin oxide, bismuth oxide, silicon nitride, silicon aluminum nitride, and combinations thereof, without being limited thereto. The metal oxides and/or the metal nitrides may be doped with at least one element selected from the group consisting of bismuth (Bi), boron (B), aluminum (Al), silicon (Si), magnesium (Mg), antimony (Sb), beryllium (Be), and combinations thereof.

The optical properties of the low-emissivity transparent laminate 100 may be adjusted by suitably adjusting materials and properties of the dielectric layer 150. In addition, the dielectric layer 150 may be composed of a plurality of layers.

The substrate 110 may be a transparent substrate having high transmittance of visible light, for example, a glass or transparent plastic substrate having a visible light transmittance of about 90% to about 100%. For example, the substrate 110 may be any glass used for construction, and may have a thickness of, for example, about 2 mm to about 12 mm depending upon application.

The low-emissivity transparent laminate 100 may be formed to have transmittance and reflectance corresponding to wavelength ranges of light by adjusting a material and thickness of each of the layers included in the coating layer 190, thereby realizing an optical spectrum suitable for usage. For example, the low-emissivity transparent laminate 100 may be formed to have high visible light transmittance in order to secure comfortable view, and may be formed to have increased reflectance to prevent a problem of invasion of personal privacy due to view from the outside.

The low-emissivity transparent laminate 100 allows fine control of optical properties such as color, reflectance, transmittance and the like of a highly reflective surface thereof, which is seen from the outside, by adjusting the material and thickness of each of the layers included in the coating layer 190.

The coating layer 190 may further include other intervening layers in addition to the aforementioned structure in order to realize desired optical properties, as described above. In one embodiment, the coating layer 190 may further include at least one dielectric layer on one outermost surface or on both outermost surfaces thereof.

Details of the additional dielectric layer, which may be further included in the coating layer 190, are the same as described above in relation to the dielectric layer 150.

According to another embodiment of the invention, a low-emissivity transparent laminate includes a coating layer having a symmetrical structure in which a low-emissivity protective metal layer and a dielectric layer are sequentially stacked on both surfaces of a low-emissivity layer, wherein at least one of two pairs of the low-emissivity protective metal layer and the dielectric layer includes a silicon nitride layer interposed therebetween.

Figure 2:
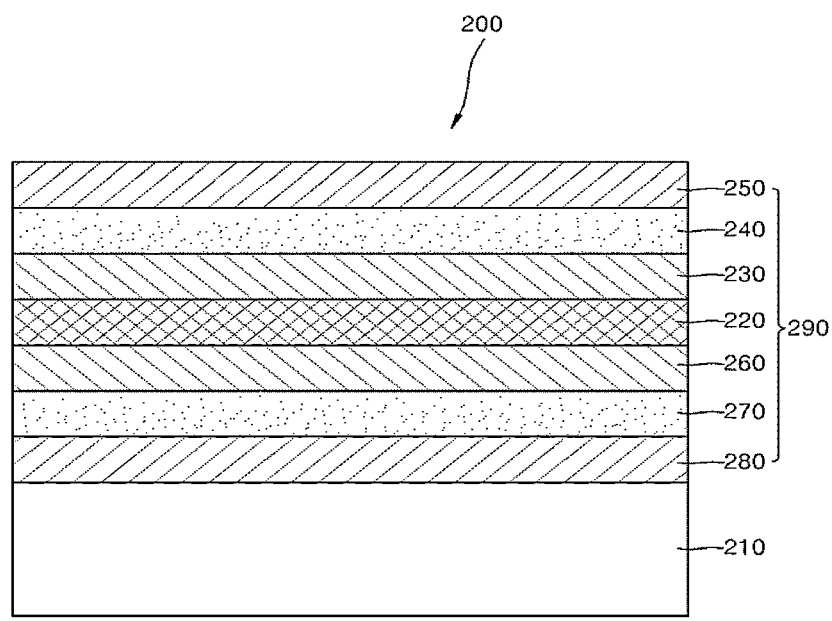
FIG. 2 is a schematic sectional view of a low-emissivity transparent laminate according to another embodiment of the present invention.

FIG. 2 is a sectional view of a low-emissivity transparent laminate 200, which includes a substrate 210 and a coating layer 290, according to another embodiment of the invention. The coating layer 290 has a multilayer structure which includes a first dielectric layer 280, a first silicon nitride layer 270, a first low-emissivity protective metal layer 260, a low-emissivity layer 220, a second low-emissivity protective metal layer 230, a second silicon nitride layer 240, and a second dielectric layer 250 in a sequential order above the substrate 210. In the low-emissivity transparent laminate 200, the coating layer 290 has a structure formed by sequentially stacking the low-emissivity protective metal layers 230, 260, the silicon nitride layers 240, 270 and the dielectric layers 250, 280 on the upper and lower surfaces of the low-emissivity layer 220.

In one embodiment, the coating layer may further include at least one silicon nitride layer on the uppermost and lowermost surfaces thereof. For example, the coating layer may further include a silicon nitride layer (not shown) stacked on an outer surface of the second dielectric layer 250, or a silicon nitride layer (not shown) stacked between the first dielectric layer 280 and the substrate 210. As such, since the coating layer includes plural silicon nitride layers and thus can protect the low-emissivity protective metal layer 130 better during heat treatment, the coating layer including the plural silicon nitride layers can exhibit further improved heat resistance, as compared with a coating layer including a single nitride layer having a thicker thickness, even though the plural silicon nitride layers have the same total thickness as the single nitride layer. In accordance with another aspect of the present invention, a building material includes the low-emissivity transparent laminate as set forth above. Since the building material uses the low-emissivity transparent laminate, the building material can exhibit improved heat resistance and thus can be processed by additional heat treatment while securing thermal insulation properties due to low-e, as described above. For example, the building material may be subjected to heat treatment for improvement of wind pressure resistance, and may be used as a building material for skyscrapers.

Each of the layers of the low-emissivity transparent laminate may be formed by stacking the layer using any method known in the art. For example, each of the layers may be stacked using any deposition method known in the art.

For example, the dielectric layer may be deposited by any method known in the art. For example, the dielectric layer may be deposited using a magnetron sputter.

Next, the present invention will be described in more detail with reference to some examples. It should be understood that these examples are provided for illustration only and are not to be in any way construed as limiting the present invention.

EXAMPLES

Example 1

A low-emissivity transparent laminate having a composition and thickness as listed in Table 1 was manufactured using a magnetron (C-Mag) sputter (Cetus-S, Selcos Co., Ltd.).

First, a 19 nm thick $SnZnO_x$ layer was deposited onto a 6 mm thick transparent glass substrate in an oxygen/argon atmosphere (50% by volume (vol %) of oxygen, 50 vol % of argon). Next, a 5 nm thick $SiN_x$ layer was deposited in a nitrogen/argon atmosphere (20 vol % of nitrogen, 80 vol % of argon). A 1.5 nm thick NiCr layer, an 11 nm thick Ag layer and a 1.5 nm thick NiCr layer were deposited in a 100 vol % argon atmosphere in order, followed by depositing a 5 nm thick $SiN_x$ layer again under the same deposition conditions as in the $SiN_x$ layer. Finally, a 43 nm thick $SnZnO_x$ layer was deposited under the same deposition conditions as in the above $SnZnO_x$ layer, thereby manufacturing a low-emissivity transparent laminate.

Example 2

A low-emissivity transparent laminate was manufactured in the same manner as in Example 1 except that a 5 nm thick $SiN_x$ layer was additionally stacked on an uppermost side of the low-emissivity transparent laminate of Example 1.

Examples 3 to 5

Low-emissivity transparent laminates were manufactured in the same manner as in Example 1 except that the number of 5 nm thick $SiN_x$ layers and disposition positions thereof were modified as listed in Table 1, respectively.

Comparative Example 1

A low-emissivity transparent laminate was manufactured in the same manner as in Example 1 except that the $SiN_x$ layers were omitted.

Comparative Example 2

A low-emissivity transparent laminate was manufactured in the same manner as in Example 1 except that a 5 nm thick $SnZnO_x$ layer was deposited in a nitrogen/argon atmosphere (50 vol % of nitrogen, 50 vol % of argon) instead of the $SiN_x$ layer.

Comparative Example 3

A low-emissivity transparent laminate was manufactured in the same manner as in Example 1 except that the number of 5 nm thick $SiN_x$ layers and disposition positions thereof were modified as listed in Table 1.

TABLE 1

| | Multilayer structure (Film thickness, nm) |
| --- | --- |
| Example 1 | Transparent glass/$SnZnO_x$(19)/$SiN_x$(5)/NiCr(1.5)/Ag(11)/NiCr(1.5)/$SiN_x$(5)/$SnZnO_x$(43) |

TABLE 1-continued

| | Multilayer structure (Film thickness, nm) |
|---|---|
| Example 2 | Transparent glass/SnZnO$_x$(19)/SiN$_x$(5)/NiCr(1.5)/Ag(11)/NiCr(1.5)/SiN$_x$(5)/SnZnO$_x$(43)/SiN$_x$(5) |
| Example 3 | Transparent glass/SnZnO$_x$(19)/NiCr(1.5)/Ag(11)/NiCr(1.5)/SiN$_x$(5)/SnZnO$_x$(43)/SiN$_x$(5) |
| Example 4 | Transparent glass/SnZnO$_x$(19)/SiN$_x$(5)/NiCr(1.5)/Ag(11)/NiCr(1.5)/SnZnO$_x$(43)/SiN$_x$(5) |
| Example 5 | Transparent glass/SiN$_x$(5)/SnZnO$_x$(19)/SiN$_x$(5)/NiCr(1.5)/Ag(11)/NiCr(1.5)/SiN$_x$(5)/SnZnO$_x$(43)/SiN$_x$(5) |
| Comparative Example 1 | Transparent glass/SnZnO$_x$(19)/NiCr(1.5)/Ag(11)/NiCr(1.5)/SnZnO$_x$(43) |
| Comparative Example 2 | Transparent glass/SnZnO$_x$(19)/SnZnN$_x$(5)/NiCr(1.5)/Ag(11)/NiCr(1.5)/SnZnN$_x$(5)/SnZnO$_x$(43) |
| Comparative Example 3 | Transparent glass/SiN$_x$(5)/SnZnO$_x$(19)/NiCr(1.5)/Ag(11)/NiCr(1.5)/SnZnO$_x$(43)/SiN$_x$(5) |

Evaluation of Properties

Each of the low-emissivity transparent laminates manufactured in Examples 1 to 5 and Comparative Examples 1 to 3 was subjected to heat treatment in the following manner:

Each of the specimens was placed in a rapid thermal annealing system (RTS) for laboratory use, followed by heating an internal temperature of the RTS to about 670° C. for 5 minutes. Next, the RTS was maintained at the internal temperature for 5 minutes, followed by cooling the internal temperature thereof to room temperature.

Before and after heat treatment, visible transmittance and haze were measured on each specimen using a Haze-Gard plus apparatus, and emissivity was measured on the specimen using an emissiometer (MK3). In addition, changes in spectral characteristics of the specimen before and after heat treatment were observed using a spectrophotometer (KS L 2514 standard). Results are shown in Table 2.

TABLE 2

| | Remarks | ΔVisible light transmittance | ΔHaze (Haze) | ΔEmissivity (%) |
|---|---|---|---|---|
| Example 1 | Change before and after heat treatment (Δ) | 2.6 | 0.08 | 0 |
| Example 2 | Change before and after heat treatment (Δ) | 1.4 | 0.14 | 0 |
| Example 3 | Change before and after heat treatment (Δ) | 4.1 | 0.03 | 0 |
| Example 4 | Change before and after heat treatment (Δ) | 4.3 | 0.02 | 0 |
| Example 5 | Change before and after heat treatment (Δ) | 1.6 | 0.03 | 0 |
| Comparative Example 1 | Change before and after heat treatment (Δ) | 13.2 | 3.37 | 39 |
| Comparative Example 2 | Change before and after heat treatment (Δ) | 4.9 | 0.13 | 0 |
| Comparative Example 3 | Change before and after heat treatment (Δ) | 5.3 | 0.03 | 0 |

As shown in Table 2, it can be seen that the specimens of Examples 1 to 5 using the SiN$_x$ layer had no changes in emissivity before and after heat treatment and exhibited significantly reduced changes in visible light transmittance and haze, as compared with the specimen of Comparative Example 1. From these results, it can be seen that the SiN$_x$ layer protected a low-emissivity layer and a low-emissivity protective metal layer after heat treatment.

In comparison of the specimen including the SiN$_x$ layer between a metal layer and an oxide dielectric layer on both upper and lower surfaces thereof (Example 1) with the specimen including the SnZnN$_x$ layer disposed instead of the SiN$_x$ layer (Comparative Example 2), it can be seen that the specimen using the SiN$_x$ layer exhibited smaller changes in visible light transmittance and haze. From these results, it can be seen that the specimen using the SiN$_x$ layer instead of the SnZnN$_x$ layer exhibited still further improved heat resistance.

In comparison of the specimen including the SiN$_x$ layer between a low-emissivity protective metal layer and a dielectric layer on each of upper and lower surfaces thereof (Example 1) with the specimen including the SiN$_x$ layers on both uppermost and lowermost surfaces of a coating layer (Comparative Example 3), it can be seen that the specimen of Example 1 exhibited smaller changes in visible light transmittance before and after heat treatment.

In addition, it can be seen that the specimens including the SIN$_x$ layer between the low-emissivity protective metal layer and the oxide dielectric layer only on the upper (or lower) side thereof (Examples 3 and 4) exhibited smaller changes in visible light transmittance, as compared with the specimen of Comparative Example 3. In comparison of the specimens of Examples 3 and 4, which included one SIN$_x$ layer between the metal layer and the oxide dielectric layer and the other SIN$_x$ layer on one outermost side of the coating layer, with the specimen of Example 1 including the SIN$_x$ layer between the metal layer and the oxide dielectric layer on each of the upper and lower surfaces thereof, it can be confirmed that, although the specimens of Example 3 and 4 exhibited better heat resistance than the specimen of Comparative Example 3, the specimen of Example 1 including the SINx layer between the metal layer and the oxide dielectric layer on each of the upper and lower surfaces thereof exhibited better heat resistance and thus further improved optical properties than the specimens of Examples 3 and 4. From these results, it can be seen that use of the SIN$_x$ layer between the low-emissivity protective metal layer and the oxide dielectric layer further contributed to improvement in heat resistance of the specimen, as compared with use of the SIN$_x$ layer on the uppermost or lowermost side of the coating layer.

Since the specimen of Example 5 included the four SIN$_x$ layers in total and thus had an increased thickness, the specimen of Example 5 exhibited excellent heat resistance.

LIST OF REFERENCE NUMERALS

100, 200: low-emissivity transparent laminate
110, 210: substrate
120, 220: low-emissivity layer
130, 230, 260: low-emissivity protective metal layer
140, 240, 270: silicon nitride layer
150, 250, 280: dielectric layer
190, 290: coating layer

The invention claimed is:

1. A low-emissivity transparent laminate comprising:
a substrate; and
a coating layer,
wherein the coating layer has a multilayer structure comprising a low-emissivity layer, a low-emissivity protective metal layer, a first silicon nitride layer, and a dielectric layer directly on the first silicon nitride layer, stacked sequentially from the substrate,
wherein the dielectric layer includes zinc tin oxide,
wherein the first silicon nitride layer has a thickness from 5 nm to 20 nm, and
wherein the coating layer further comprises at least one additional silicon nitride layer on uppermost and lowermost surfaces thereof,
wherein the low-emissivity layer is Ag, wherein the low-emissivity layer has a thickness from 10 nm to 25 nm, wherein the low-emissivity protective metal layer is selected from alloys of Ni and Cr, wherein the low-emissivity protective metal layer has a thickness from 1 nm to 5 nm, wherein the dielectric layer has a thickness from 5 nm to 60 nm, wherein the substrate is a transparent substrate having a visible light transmittance from 90% to 100%, wherein the substrate is a glass or transparent plastic substrate, wherein the coating layer has a symmetrical structure in which the low-emissivity protective metal layer and the dielectric layer are sequentially stacked on both surfaces of the low-emissivity layer.

2. The low-emissivity transparent laminate according to claim 1, wherein the low-emissivity layer has an emissivity from 0.01 to 0.3.

3. The low-emissivity transparent laminate according to claim 1, wherein the low-emissivity protective metal layer has an extinction coefficient from 1.5 to 3.5 in a visible light range.

4. The low-emissivity transparent laminate according to claim 1, wherein the first silicon nitride layer comprises $SiN_X$ ($1<x<1.5$) or $(Si_{1-y}M_y)N_Z$ (M is one selected from the group consisting of Al, Ti, Co and combinations thereof; $0.01<y<0.2$; and $1<z<1.5$).

5. The low-emissivity transparent laminate according to claim 1, wherein the dielectric layer further comprises at least one selected from the group consisting of metal oxides, metal nitrides and combinations thereof, or comprises the at least one doped with at least one element selected from the group consisting of bismuth (Bi), boron (B), aluminum (Al), silicon (Si), magnesium (Mg), antimony (Sb), beryllium (Be), and combinations thereof.

6. The low-emissivity transparent laminate according to claim 1, wherein the dielectric layer further comprises at least one selected from the group consisting of titanium oxide, zinc oxide, zinc aluminum oxide, tin oxide, bismuth oxide, silicon nitride, silicon aluminum nitride, and combinations thereof.

7. A building material comprising the low-emissivity transparent laminate according to claim 1.

* * * * *